No. 644,015. Patented Feb. 20, 1900.
P. JEAN & A. BOUCHON.
ILLUMINATED SIGN.
(Application filed Jan. 19, 1899.)
(No Model.) 2 Sheets—Sheet 2.
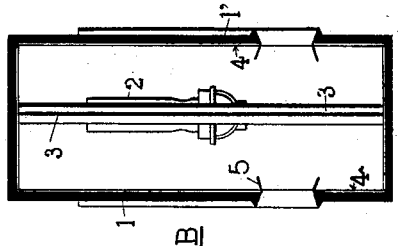
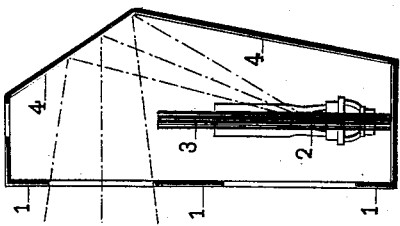
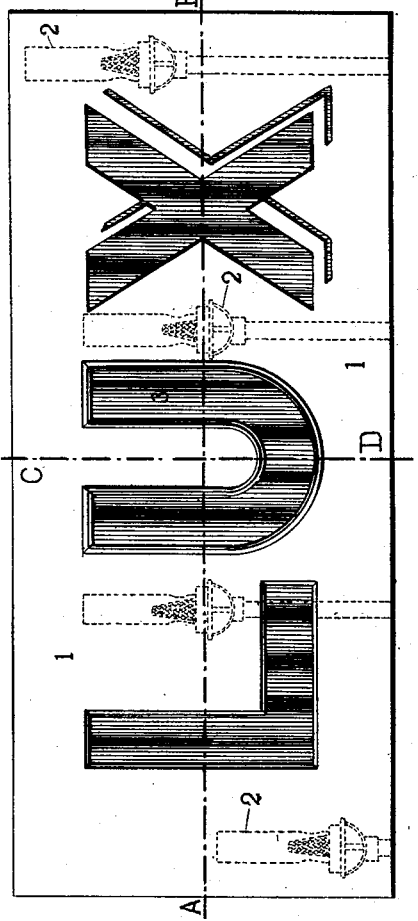
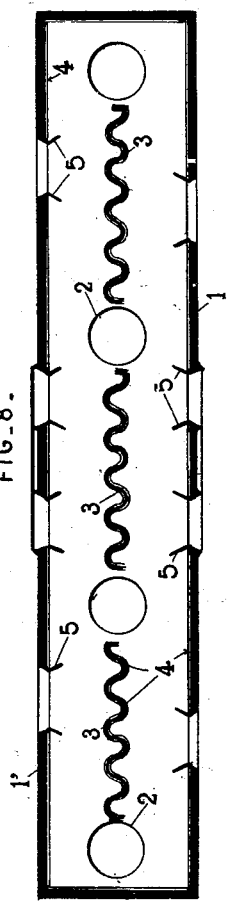
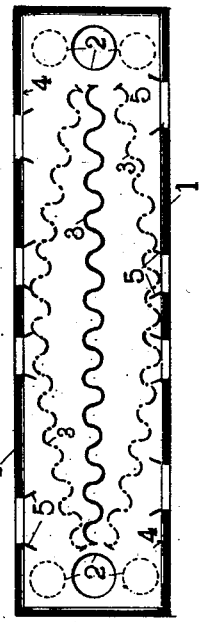

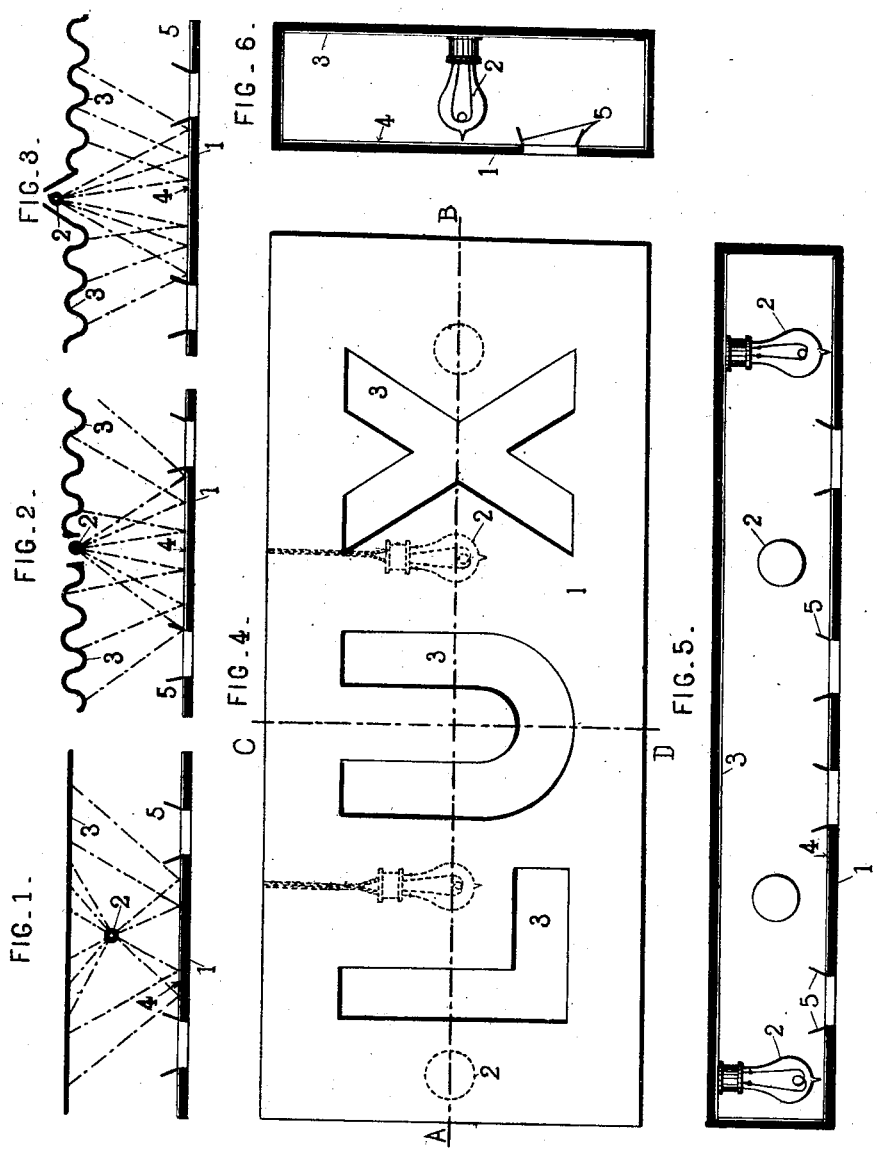

UNITED STATES PATENT OFFICE.

PAUL JEAN AND ALBERT BOUCHON, OF PARIS, FRANCE.

ILLUMINATED SIGN.

SPECIFICATION forming part of Letters Patent No. 644,015, dated February 20, 1900.

Application filed January 19, 1899. Serial No. 702,647. (No model.)

*To all whom it may concern:*

Be it known that we, PAUL JEAN and ALBERT BOUCHON, citizens of the Republic of France, residing at Paris, France, have invented a new and useful Improvement in Illuminated Signs, of which we declare the following to be a full, clear, and exact description, reference being had to the accompanying drawings, which form a part hereof.

Our invention consists in a method of illuminating which has for its object to produce for the purpose of luminous advertisement, decoration, and the like, with the aid of apparatus of moderate dimensions, intense luminous effects similar to those which would be produced by letters which are cut out separately from a bright metallic sheet or plate and that are intensely illuminated by means of an electric projector-lamp in such a manner as to show up the said letters very sharply and with metallic reflection in the darkness of the night. This method of illuminating affords the maximum visibility, but is inapplicable, because it requires special conditions which shall allow of placing the projector at a sufficient distance for illuminating uniformly the whole of the design.

Our method consists, substantially, first, in substituting for cut-out letters a continuous plate or backing having a smooth bright surface or which may be undulating, crimped, or ornamented in any suitable manner, but in all cases being illuminated in an intense and uniform manner by one of the means hereinafter described, and, second, in placing at a small distance in front of said backing relatively to the observer an opaque wall of a dark color which is not illuminated on its front side and in which are cut openings in the form of the letters, designs, or devices of any kind which are to be shown up by the illumination. This perforated wall thus shows externally only those parts of the bright backing which can be seen through the cut-out devices that are shown up powerfully on the front dark surface of the said wall, so that the design formed by the cut-out portions is shown very sharply in light.

Figures 1, 2, and 3 are sectional diagrammatic views illustrating different forms of our invention. Fig. 4 is an elevation of one form or embodiment of our invention. Fig. 5 is a horizontal section of the same, taken on the line A B of Fig. 4; and Fig. 6 is a vertical section taken on the line C D of Fig. 4. Fig. 7 is a front elevation of another form or embodiment of our invention having two illuminated faces. Fig. 8 is a horizontal section of the same, taken on the line A B of Fig. 7; and Fig. 9 is a vertical section taken on the line C D of Fig. 7. Fig. 10 is a horizontal section of still another form of our invention. Fig. 11 is a vertical section of a form of our invention which is especially arranged for illuminating two or more sets of letters arranged one above the other.

The illumination of the bright backing is effected by one of the apparatus shown in cross-section in the diagrammatic views, Figs. 1, 2, and 3, of the accompanying drawings—that is to say, by arranging behind the cut-out wall one or more sources of light 2 of suitable nature and intensity. These sources of light are as a general rule placed behind the full or solid portions of the wall 1 in such a manner as to be hidden from the observer and so as not to hinder in any way the view of the bright backing 3 showing through the cut-out letters. Small inclined screens 5 5 may for this purpose be arranged inside the apparatus along the edges of the cut-out letters for the purpose of preventing the sources of light from being seen from a point of view obliquely to the apparatus. The rays emitted from the sources of light 2 are projected onto the backing 3 either directly or by reflection or partly directly and partly by reflection from the inner surface 4 of the wall 1, which said surface is for this purpose made reflecting or is painted white or of any other light color which absorbs the least possible amount of light and which is as much as possible of a diffusing nature. The sources of light 2, while being arranged behind the full parts of the perforated front wall 1, may be placed (a) either in front of the bright backing 3, Fig. 1, in which case, the latter, being illuminated both by the direct rays and by the rays reflected from the inner surface 4 of the wall 1, (along the paths shown in dash-dotted lines,) reflects the image of the said surface, which is uniformly lighted, while preserving its metallic luster, (b) or the sources of light may be arranged in the same plane as Fig. 2 or slightly to the rear, Fig. 3, of the bright backing 3, in which case the said backing is illumined exclusively by the rays reflected from the surface 4 of the wall 1, but it will still shine with uniform brightness by reason of the fact that it reflects, as in the preceding case, the image of the surface 4 without, however, ever being able to give a direct image of the source of light.

We have shown by way of example several applications of the devices as specified by the preceding general description. The luminous board or tablet having only one face, which is shown in elevation, horizontal section, and cross-section in Figs. 4, 5, and 6, is provided with the arrangement referred to under a. It consists of a metallic case the front wall 1 of which fulfils the function of the perforated opaque wall above mentioned. The bright backing is constituted by the rear wall 3 and is lighted by a series of electric lamps 2, which may be in any number, but which are always situated in front of said backing and behind the full portions of the wall 1.

The apparatus shown in similar views at Figs. 7, 8, and 9 is similar to the preceding arrangement; but it has two faces and is lighted by means of the arrangement referred to under b. This apparatus comprises two perforated opaque walls 1 and 1', constructed according to the conditions above mentioned and placed on either side of an undulating or crimped backing 3, whose two surfaces are bright and are lighted up by sources of light 2 2—for example, Welsbach burners—arranged in the same plane as the backing 3 and from which the rays of light are reflected upon the said backing from the reflecting inner surfaces of the cut-out opaque walls 1 and 1', the sources of light 2 2 being in this case hidden from external observation by the full portions of the wall 1, as well as by those of the wall 1'.

For the purpose of illuminating luminous pictures or tablets of small length we may employ the arrangement shown in Fig. 10—that is to say, we may illuminate the apparatus solely by means of sources of light 2 2, placed at ends either in the same plane as the bright backing 3 (which position is shown in full lines) or on each side of the said plane, (which position is shown in dotted lines.) In this case also we may employ a bright backing 3 of greater or less curvature, as shown in dash-dotted lines, in such a manner that the parts of said backing which are farthest away from the sources of light shall be situated nearest to the apertures with a view of rendering the luminous effect thereof more uniform.

The letters, &c., may be either simply cut out, as shown at Figs. 4, 5, and 6, or they may be bordered with a bevel edge, as shown at the letter L of Figs. 7, 8, and 9, or with a continuous projection formed by a double-inclined plane, as shown at the letter U, which are designed to show up the outlines of letters, or they may be provided with narrow slits, as shown at the letter X, with the object of simulating a relief of the letter, or they may be ornamented in any suitable manner.

In cases where the sign or luminous inscription comprises two or more lines of writing placed one above the other we employ, by preference, the arrangement shown in Fig. 11, which allows of the illumination of such lines of letters by means of one single row of sources of light. As shown in this figure, the letters which compose the lines which are superposed one above the other (two are shown in the example) are cut out in the opaque front wall 1 of the apparatus. At the rear of the lower line there is arranged the bright, smooth, undulating, or crimped backing 3, which is divided into several segments, between which are placed behind the full parts of the wall 1 the Welsbach burners 2 2, this arrangement fulfilling with respect to the lower line of letters the same function as that which was described with reference to Figs. 7, 8, and 9. For the purpose of producing the illumination of the upper line the apparatus is further provided with a backing 4 4, having an inner bright surface or of a light color or of a smooth undulating or crimped nature formed of two or more flat parts suitably inclined, or it may be curved in cross-section, so as to cause a part of the luminous rays to be reflected, (following, for example, the paths shown in dash-dotted line,) so as to pass out of the apparatus through the cut-out letters of the upper line, and thus to represent in light the shape of the letters of that line. This arrangement, of which the constructional details can obviously vary according to each particular application, has, as compared with the preceding arrangements in the particular cases for which it is intended, the advantage of enabling two or more lines of a luminous sign to be illuminated by a number of sources of light, which number is not greater than that which is necessary for the illumination of a single line. In this respect, therefore, it effects a considerable economy in the lighting.

Our apparatus may also be arranged to allow the device cut out in the opaque wall to be seen very clearly by daylight. For this purpose we give to the backing 3 a color which forms a sufficient contrast with that of the outer or visible face of the front opaque wall 1.

The bright backing 3 may be either smooth or preferably undulating or crimped in such a manner as to produce brilliant reflexes or decorative flashes of light. The sources of light 2 2 may be in any suitable number and may be arranged at the lower part, half-way, or at the upper part of the luminous sign, as shown in Fig. 7. Our system has the advantage of requiring for the erection of the illuminating apparatus only a slight depth of the case, which can in practice be reduced to a few centimeters. The cut-out devices in the opaque walls may, if desired, be covered with a thin plate of glass or other transparent substance intended to prevent the wind, rain, or dust from entering the interior of the casing.

Having now particularly described and ascertained the nature of this invention and in what manner the same is to be performed, we declare that what we claim is—

1. In an illuminated sign, the combination of a casing provided with apertures along one or both longitudinal faces, lamps arranged opposite the solid portions of said faces, reflecting-surfaces upon said solid portions, said apertures being provided with continuous internal flanges or shields so arranged as to prevent any ray of light from said lamps from striking directly through said apertures, and one or more reflecting-surfaces arranged within said casing and opposite said apertures, substantially as set forth.

2. An apparatus for producing luminous letters, designs, pictures, &c., consisting of a casing having internally-reflecting front and rear walls provided with suitable apertures, a double-faced reflector located between said walls, and a series of lamps or other lighting devices situated in the same plane as the said reflector, substantially as set forth.

In witness whereof we have hereunto set our hands in presence of two witnesses.

PAUL JEAN.
ALBERT BOUCHON.

Witnesses:
GEORGES DELONY,
J. ALLISON BOWEN.